(12) United States Patent
Wegener (10) Patent No.: US 7,038,805 B1
(45) Date of Patent: May 2, 2006

(54) METHOD AND DEVICE FOR ELECTRONIC ARCHIVING OF A COMPUTER DATA FLOW

(75) Inventor: Harald Wegener, Velden (DE)

(73) Assignee: Oce Printings Systems GmbH, Poing (DE)

( * ) Notice: Subject to any disclaimer, the term of this patent is extended or adjusted under 35 U.S.C. 154(b) by 0 days.

(21) Appl. No.: 09/486,797

(22) PCT Filed: Aug. 28, 1998

(86) PCT No.: PCT/EP98/05460

§ 371 (c)(1),
(2), (4) Date: Feb. 28, 2000

(87) PCT Pub. No.: WO99/12337

PCT Pub. Date: Mar. 11, 1999

(30) Foreign Application Priority Data

Aug. 29, 1997 (DE) .................. 197 37 811

(51) Int. Cl.
*G06F 15/00* (2006.01)
(52) U.S. Cl. ............. 358/1.16; 358/1.15; 358/1.17
(58) Field of Classification Search ........... 358/1.16, 358/1.15, 1.17, 450; 705/9; 707/506; 400/68, 400/76; 382/283, 176, 276, 213; 715/506, 715/517
See application file for complete search history.

(56) References Cited

U.S. PATENT DOCUMENTS

| 4,944,614 A | * | 7/1990 | Tanaka ................. 400/68 |
| 5,140,650 A | * | 8/1992 | Casey et al. ............ 382/283 |
| 5,721,940 A | * | 2/1998 | Luther et al. ........... 707/506 |
| 6,246,993 B1 | * | 6/2001 | Dreyer et al. ............ 705/9 |
| 6,449,665 B1 | * | 9/2002 | Schanding ............. 710/22 |

FOREIGN PATENT DOCUMENTS

| DE | 44 08 327 A1 | 9/1995 |
| DE | 195 15 981 A1 | 11/1996 |
| EP | 0 654 746 A2 | 5/1995 |

* cited by examiner

*Primary Examiner*—Twyler M. Lamb
(74) *Attorney, Agent, or Firm*—Schiff Hardin LLP (57) ABSTRACT

A method and apparatus for electronic archiving of a data stream that has both text and graphics includes separating form data that stays the same from document to document from variable data that varies from document to document. The form data is treated differently in the archiving process from the variable data. For example, only one copy of the form data need be stored, while the smaller data files of the variable data occupy less storage space. Index data is generated to facilitate overlay of the form data and variable data to permit recreation of the original documents. The data is converted into a printer-specific data format to facilitate separation into the different data types.

18 Claims, 7 Drawing Sheets

METHOD AND DEVICE FOR ELECTRONIC ARCHIVING OF A COMPUTER DATA FLOW

BACKGROUND OF THE INVENTION

1. Field of the Invention

The present invention is directed to a method and an apparatus for electronic archiving of the data stream output by a computer.

2. Description of the Related Art

Such a method and such an apparatus are disclosed by German Patent Document DE 4408327 A1. In computer-generated documents that contain both graphic as well as numerical and alphanumerical information, are thereby transmitted to an archiving system via an interface, for example a standard printer interface. Within the archiving system, the data belonging to the documents are stored long-term on bulk storage devices such as magnetic tapes, magnetic or optical storage disks or the like. This type of storage is increasingly replacing earlier procedures wherein documents or, respectively, originals present on paper were acquired with an optical scanner, the image obtained in this way was converted into electrical signals and then deposited in archives. The previously standard microfilming of documents is being increasingly replaced by this new technique when the originals are already present in the form of electronic signals or, respectively, computer data streams.

Electronic archiving systems of the type initially cited usually convert a data stream output by the computer into a data stream having a specific data format matched to the archive. In many applications, the data stream of the computer is matched to specific output systems, particularly to printers. Examples of such print data streams are the IPDS (Intelligent Printer Data Stream) format coined by IBM or the PCI (Printer Command Language) format coined by Hewlett Packard.

An archiving system converts these data streams onto a format that corresponds to the archiving system. The direct storing of the data output by the computer system thereby proves very disadvantageous because an extremely great number of system parameters, for example character fonts, would have to be stored as well. The reproduction of data stored in this way would then also prove very complex. Archiving systems therefore store the data on a pixel-oriented basis, for example in what is referred to as the TIF (Tagged Image File) format. Such a storing technique constructed point-by-point then opens up the possibility of reducing the data volume according to standard compression methods. The data volume of such compressed data is all the greater the more black-and-white transitions there are to be processed. On the other hand, printed pages are being increasingly designed in an optically more complex fashion. For example, gray scale grids more frequently form the background on forms in order to make these more optically attractive and make emphases more recognizable. The result of this development is that printed pages have a higher and higher memory requirement when archived.

In another known system, what is referred to as the COLD (Computer Output to Laser Disk) system, data for archiving are separately deposited as mainly graphic data and mainly encoded data (line data). In the expanded COLD method, raw data and resources are likewise separately deposited, and the entire printing process is simulated in the reproduction. This causes a complex resource management.

German Patent Document DE 195 15 981 A1 discloses a method for acquiring manually written documents wherein the documents are scanned and subsequently further-processed at picture screens while blanking out re-print information. Since the pre-print information are no longer available in the further-processing, this method is only suitable when the information printed on the original is still known or, respectively, available at the time of the further-processing. This method is therefore hardly suited for a long-term archiving system.

European Patent Document EP 654 746 A2 discloses a method for archiving forms that corresponds to the procedure with optical scanning of documents that was already initially mentioned. Blank forms are thereby scanned first and the data of the blank forms are deposited in a computer. Filled-out forms to be archived are likewise scanned later and the data thereby acquired are compared to the stored data of the blank forms. To which blank form the filled-out form corresponds is investigated first, and the variable, filled-out data are then extracted from the filled-out form. The extracted data together with a reference to the data of the blank forms are then stored. In this method, the filled-out forms must be present in printed form so that they can be scanned and archived. For comparison, it is also necessary that the blank forms have already been scanned and stored before the archiving of a filled out form can ensue.

The publication of Wong, K. Y. et al., "Document Analysis System", in IBM J. Res. Develop., Vol. 26, No. 6, November 1982, pages 647–656 describes a method for distinguishing between text data and graphics data. It is suitable for the manual processing of scanned documents but cannot be employed without further ado for the archiving of print data.

SUMMARY OF THE INVENTION

An object of the invention is to offer a system for archiving computer data streams wherein a high degree of data compression can be achieved, even when complex graphic information are to be archived.

This object and others are achieved by the invention of a method for electronic archiving of the data stream output by a computer in a computer-specific data format that contains graphic and/or text information, whereby the data stream is converted from the printer-specific data format into a data format based on pixels, form data being distinguished from variable data in the data stream based on pixels; and these two data types being respectively differently processed. Advantageous embodiments of the invention are that references to the form data are made. A form dataset of identical form data is stored only once within a predetermined data group, whereas the allocated variable data of all datasets of the data group (or job) are all respectively stored. A distinction is made between form data and variable data which ensues in the printer-specific data format. Preferably, form indicators for recognizing form data are sought in the data stream. The data of the data stream are first investigated in groups for form data, and the allocation between the variable data and the form data only ensues given repeated occurrence of form data. Overlay information, particularly control information, macro information, graphic information, predetermined text modules and/or predetermined text attributes may be employed as form indicators. A form dataset is stored after the first occurrence within the predetermined data group of the print data stream and is only marked as a form dataset, converted into a form bitmap and allocated to the appertaining variable dataset after a repeated, particularly a second, occurrence.

According to one embodiment, a work sequence, either printing or archiving is optionally implemented or printing and archiving are simultaneously implemented. The form data are not stored in the archive storage, in one development of the invention. The original pixel image is reconstructed from the form data and the variable data. References are used to superimpose the form data. An index dataset may be generated. The index dataset of a preferred embodiment contains a reference to the variable data, particularly to the form data.

The present invention also provides an apparatus for electronic archiving of the data stream output by a computer in a printer-specific data format that contains graphic and/or text information, whereby the print data stream is converted from the printer-specific data format into a data format based on pixels, an archiving interface being provided that differently processes form data in the data format based on pixels and variable data. In the apparatus, a printer controller that transfers variable data, form data and index data to a further-processing computer via an interface. The processing units of the further-processing computer are integrated in the printer controller. Preferably, a distinction is made between form data and variable data in the archiving interface. The data stream is investigated in the printer-specific data format for distinguishing between form data and variable data.

The present invention is based on the perception that a majority of the computer data streams to be archived are composed of two types of data, particularly data streams supplied to printers. On the one hand, forms are frequently included in these print data, these forms re-occurring in the same way for a specific number of interrelated print data sets, what are referred to as jobs. On the other hand, these forms are filled with variable data that respectively represent what is characteristic about a document. It was inventively recognized that the part of the compressed print data stream produced by forms often outweighs that part that is produced by the variable data. Inventively, thus, those data that derive from forms are separated from those data that are variable, and the two data types are respectively separately further-processed on a bitmap basis, particularly compressed. These data are stored separately from one another within the archiving system and are in turn merged later for viewing; in particular, this can ensue with pixel precision. The data of a form are only deposited once for a group of interrelated data (in a job). In the individual documents, the appertaining variable data are only linked with the form in such a way that a reference to the corresponding memory area of the form is stored. What is thereby advantageous is that the usually extensive dataset of a form is limited to a one-time storing of the form for each job. A considerable saving of memory space compared to systems of the prior art is achieved as a result thereof.

Given printed matter with a large press run, i.e. with frequently reoccurring, identical forms, a high degree of memory space saving is thereby achieved.

It is also advantageous—particularly compared to the aforementioned COLD (Computer Output to Laser Disk) systems—that the reproduction of the data takes on a very simple form because only a viewer is required for reproduction (self-supporting format) on a bitmap basis (for example, TIF format).

It also proves advantageous to store an information together with the references that enables an exact merging of the form data with the appertaining, variable data.

In another advantageous embodiment of the invention, the form data are stored as a bitmap the archive storage only once per job, i.e. per interrelated data stream, whereas the variable data of each document of the job are respectively individually stored.

In an embodiment directed to an extremely high degree of compression, the form data are reduced in content or even entirely suppressed. In such a system, only the variable data would then be stored in the archive storage.

A distinction between form data and variable data preferably ensues in the printer-specific data format, i.e. before the print data stream or, respectively, the affected parts thereof are converted into the pixel-based data format. It is thereby particularly beneficial to employ form indicators for the recognition of form data, such as, for example, the overlay data standard in IPDS (Intelligent Print Data Stream) print data streams or macros in PCL (Printer Command Language) print data streams, form-specific graphics such as gray background rectangles or the like. An entire form corresponding to a page thereby need not necessarily be sought and found. Inventively, the recognition of individual form components can already achieve a high degree of memory space saving. Several components can occur on each page.

When form indicators are employed, then high performance can be achieved in archiving because form data or, respectively, structures can be recognized relatively simply or, respectively, unambiguously. It can thereby be advantageous to utilize forms indicators relatively restrictively, whereby form are only referenced as such when it is certain with relatively simple evaluation criteria that the corresponding data converted on a pixel basis coincide pixel-exactly. Providing a minimum size for the form data to be recognized can also contribute to performance enhancement during the archiving process. Extremely small picture elements in a print data stream are then not supplied to the procedure for separate rastering and an intermediate storage but are rastered and stored in common with the variable data.

In the search of the data in the archive storage or, respectively, in the reconstruction of the original data stream, the form data can either be automatically superimposed with the content data on the basis of control signals (FIG. 1, reference) or, on the other hand, form data and variable data can be loaded separately from one another and placed on top of one another under control by the operator.

During the course of archiving, what are referred to as index data can be generated in addition to the variable data and the form data, search criteria being stored in the index data as well as the reference data to the storage locations of the variable data and, potentially, the form data.

In another, advantageous embodiment of the invention, the data transfer from the computer system into the archive system ensues via a printer controller that collaborates with a following computer. The print controller can thereby be employed both for generating a pixel data stream for driving a printer as well as for generating an archive data stream. The two data stream connections can, in particular, ensue parallel in time, as a result whereof a high speed of the overall process (printing and archiving) can be achieved. The data transfer from the controller to the computer ensues via a common interface both for the form data and the variable data of the point-oriented data format (bitmap) as well as the index data in the character-oriented (ASCII format).

The linking, i.e. the reference from the variable data to the form data, can be deposited within the variable dataset, within the corresponding index dataset or in both datasets.

BRIEF DESCRIPTION OF THE DRAWINGS

Further advantages and effects of the invention become clear on the basis of the exemplary embodiments described below, these being described in conjunction with the Figures.

DETAILED DESCRIPTION OF THE PREFERRED EMBODIMENTS

Figure 1:
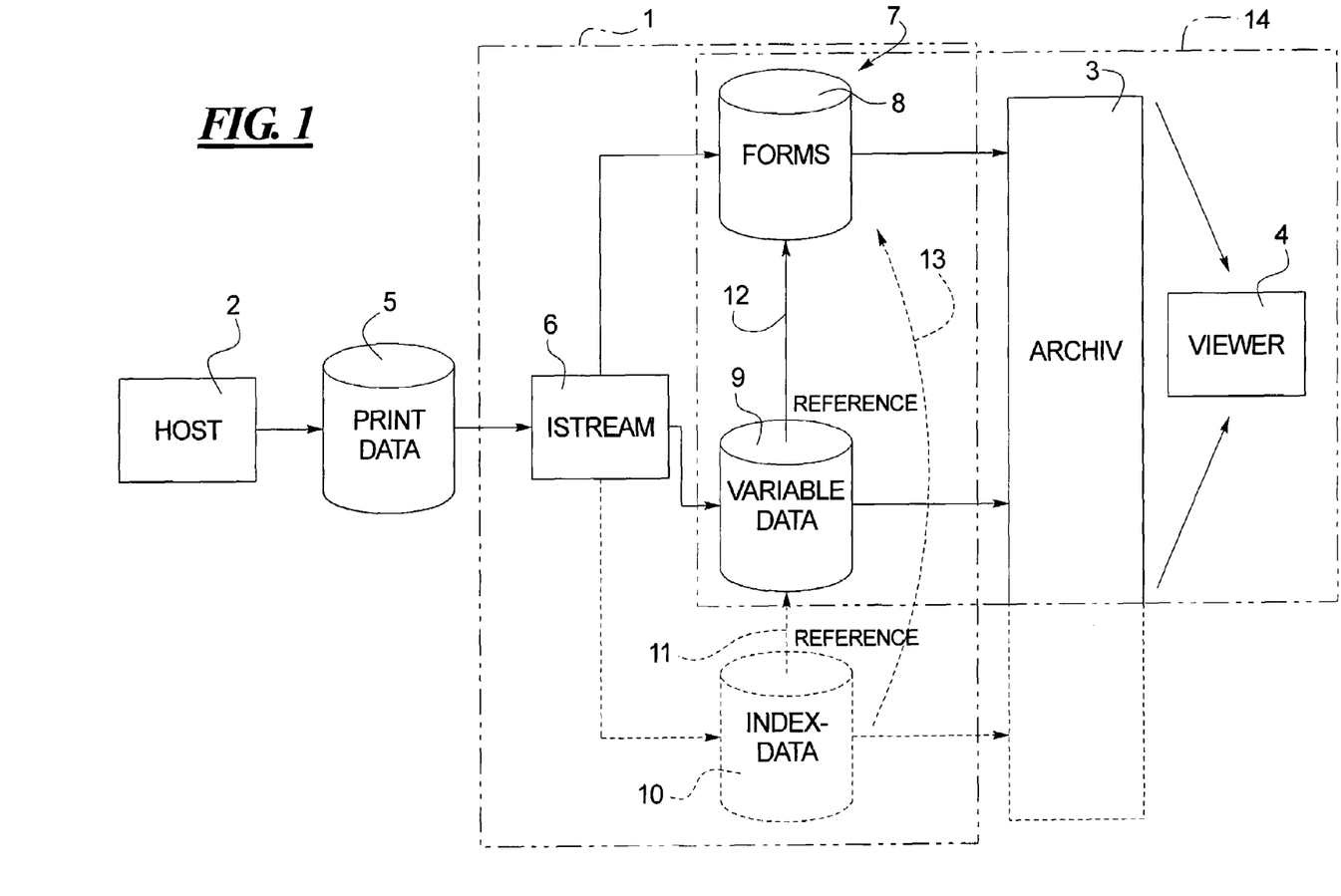
FIG. 1 is a functional block diagram of an electronic archiving system.

Given the electronic archiving system shown in FIG. 1, the data stream output by a host computer 2 is output to an archive storage 3 via an archiving interface 1. The archive storage 3 can, in particular, be a device for writing laser storage disks. The data stored in the archive storage 3 can be fetched in the bitmap-based data format with a reading device (viewer) 4 and, for example, can in turn be displayed on a computer picture screen.

The data stream 2 output by the host computer is played into a controller 6 (ISTREAM) via a standard printer interface. These data are grouped in the form of what are referred to as jobs. A job is an interrelated data stream that is linked together in some way or other (logically or physically). For example, a mark that unites specific data streams with one another to form a job can be supplied from the outside within the host computer.

Within the archiving interface, the data 5 supplied from the host computer are classified according to variable data 9 and form data 8. The form data (for example, overlays) thereby represent a fixed part of the job that appears unmodified on a plurality of printed pages of the job. The variable data, in contrast, differ from printed page to printer page within a job.

In the archiving interface, the form data 8 for each form are respectively deposited only once for each job, whereas the variable data are deposited page-by-page. At the same time, index data are generated that contain certain supplemental information for the variable data, for example extracted ordering numbers, names, key words or the like. During the course of further processing, the index data are further-processed in the form of a data bank and make it possible for the later user of the archive to relocate specific datasets. The index data contain reference information 11 for all variable datasets that enable the allocation or, respectively, the relocating of the variable data 9.

In order to also unite all variable data of a printed page with the underlying form dataset 8, a reference must ensue between variable data and form. This can ensue either directly as a reference 12 or indirectly via the index dataset 10 as an indirect reference 13. For dependability, all three reference types 11, 12 and 13 can be deposited in common for each printer page. The data structure 7 generated in this way is then supplied to the archive storage 3 via a suitable connection.

The form data 8 and the variable data 9, just like the archive data, are present within a bitmap domain 14, whereas the index data are present in an encoded format, for example an ASCII format.

Figure 2:
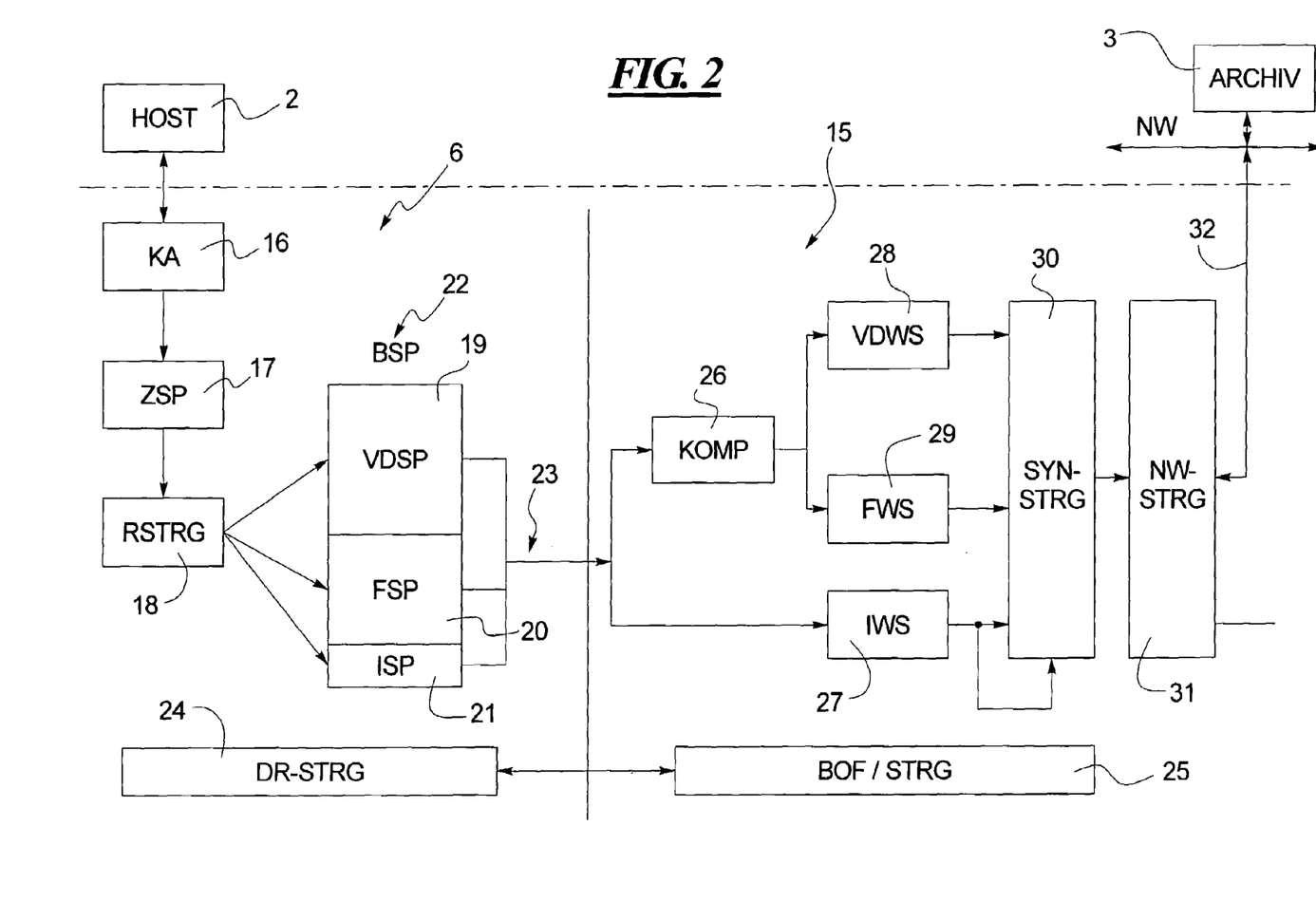
FIG. 2 is a block diagram of electronic components of the archiving system.

FIG. 2 shows an embodiment for an inventive archiving interface 1. It is subdivided into a printer controller 6 and a following computer 15 that, for example, can be a personal computer (PC).

The data delivered by the host computer 2 are supplied via a channel connection 16. From the latter, they are intermediately stored in a buffer memory 17. The data are taken successively from this memory by a raster control 18 that converts the print data into a bitmap pattern. To this end, the raster control 18 has a memory (not shown) available to it that contains raster information for converting the print data language into the corresponding bitmap information. The raster control 18 distinguishes form data from variable data within an interconnected print job. At the same time, it produces an index dataset for each job that serves the purpose of managing the data to be archived. The raster control 18 stores the variable data in a variable data memory 19, the form data in a form data memory 20 and the index data in an index data memory 21. These three memories 19, 20 and 21 are a component part of the volatile main image store 22 of the controller 6. The data generated in the data memories 19, 20 and 21 are then transmitted via a shared interface 23 to the following personal computer 15. An overall control 24 of the controller that is connected to a user interface and control 25 of the personal computer 15 controls the data transfer.

The raster control 18 handles form data and variable data differently. Separate bit maps in the form memory are generated for form data. Bitmaps that contain no form data (overlays) are generated in the memory 19 for the variable data.

The index data that are deposited in the index memory 21 contain management information that, among other things, deposits the employed form overlays for each page of the print job. The reference between variable data and form data is thereby also produced.

Within the personal computer 15, the data deriving from the memory for variable data 19 and the memory for form data 20 are compressed in a compression unit 26. The index data are preferably intermediately stored without compression in an index waiting list 27 until both variable as well as form data have passed through the compression. Two waiting lists 28 and 29 connected parallel for the variable data and for the form data are provided following the compression unit 26, the corresponding data being intermediately stored therein until the appertaining, other data have likewise passed through the compression unit.

The data located in the waiting lists 27, 28 and 29 are then taken in common by a synchronization unit 32 and are output to the output interface 30 in the direction to the archive storage 3 via a network control 31.

In another advantageous embodiment, all processing units of the personal computer 15 can also be integrated in the printer controller.

Figure 3A:
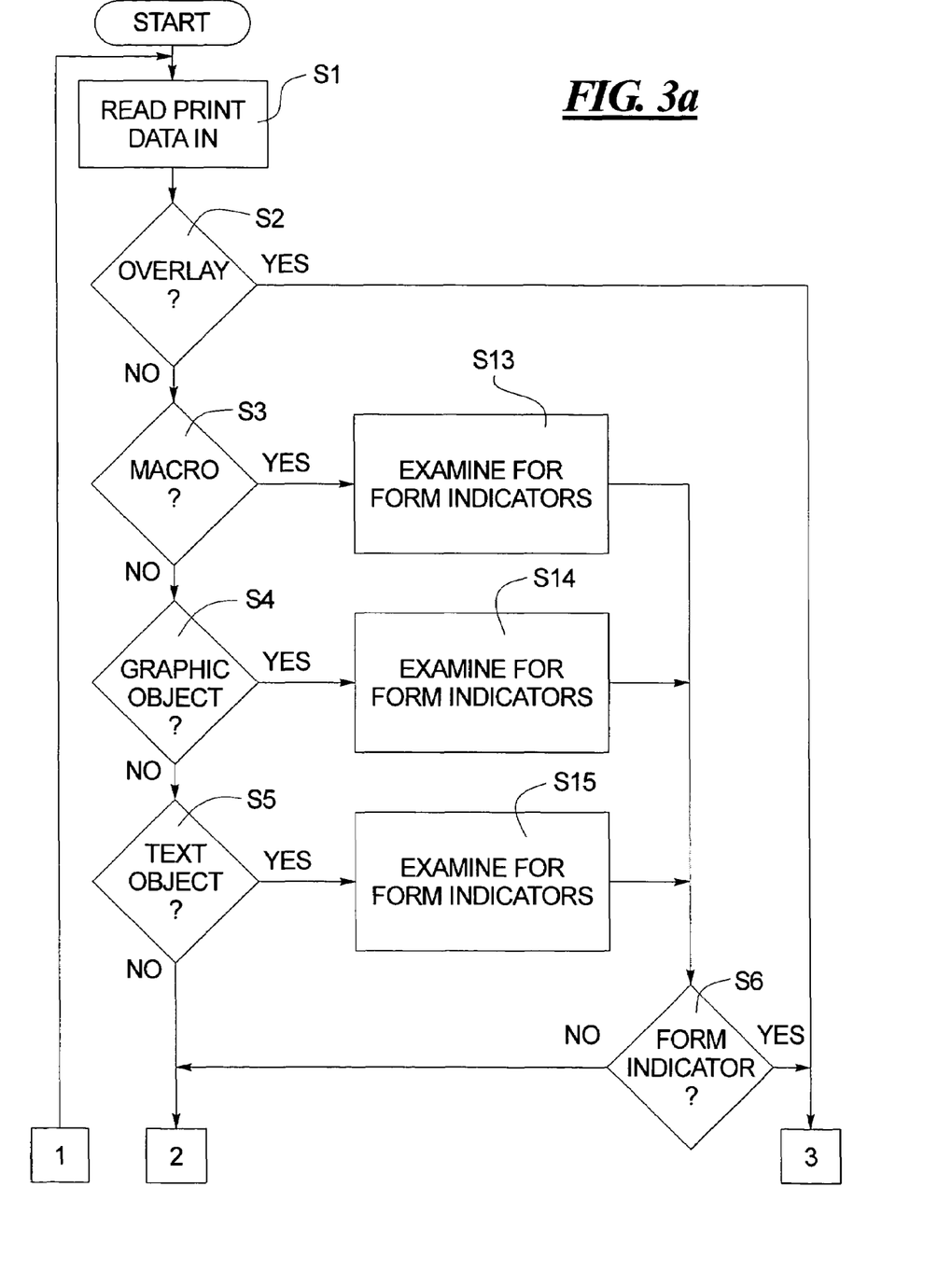
FIGS. 3a and 3b are flow charts of an executive sequence for recognizing and separating the various data types in a print data stream.
Figure 3B:
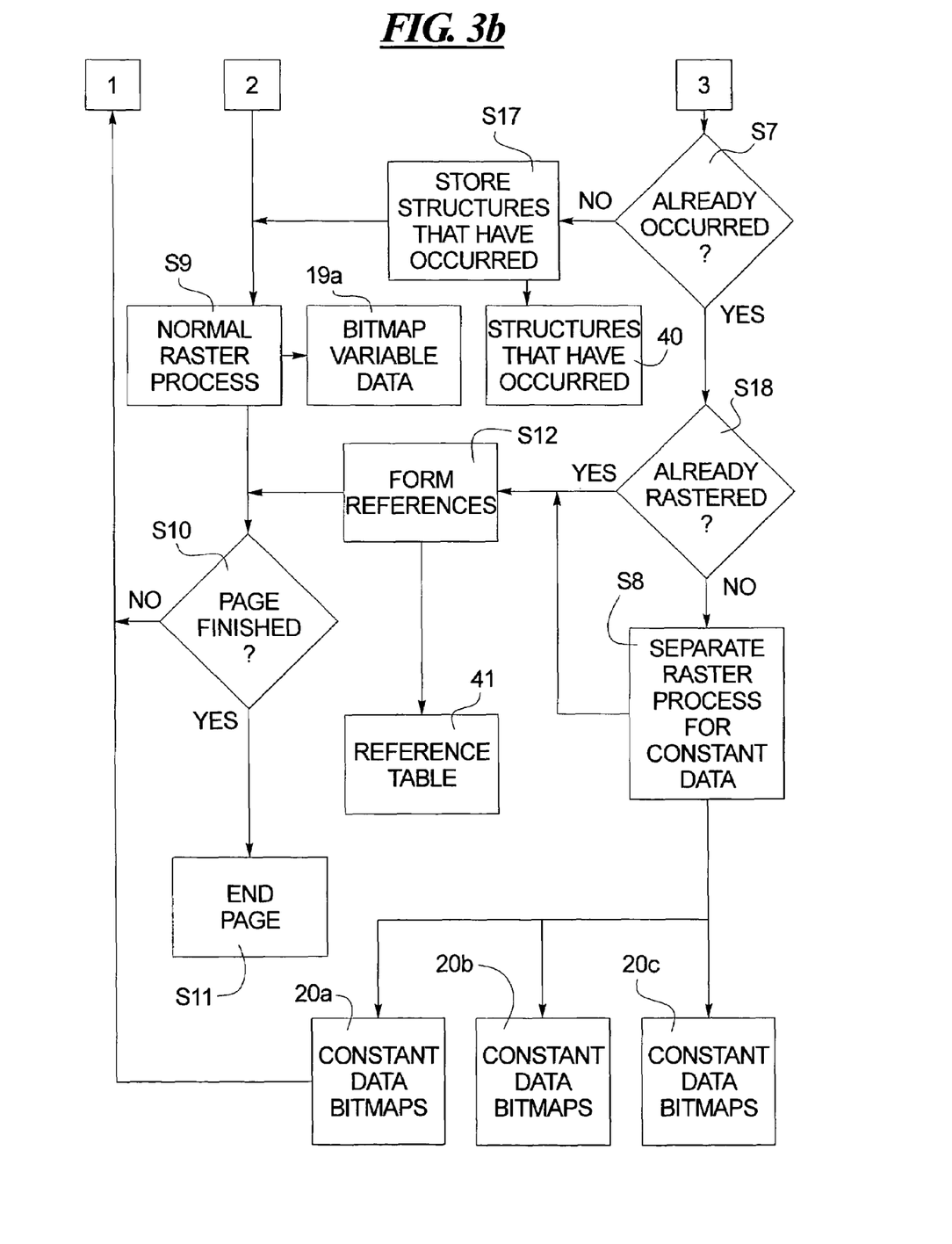

FIG. 3 shows a flowchart that shows an executive sequence for the analysis of print data. In a first step S1, a respective group of print data from the print data stream 5 is read into a predetermined area of the controller 6. The scope of the group can be individually determined, whereby a printed can, for example, be subdivided into 2, 5, 10 or even more sub-areas. The following analysis of the print data ensues in what is referred to as the CI space (coded information space). The analysis thereby ensues such that the effects of the data conversion on a pixel-based basis, i.e. in what is referred to as the NCI space (non-coded information space), are taken into consideration. To that end, the print data stream or, respectively, the groups of print data are investigated for form indicators according to certain categories. A first form indicator that, for example, is often employed in print data streams according to the IPDS format are what are referred to as overlay data or overlay calls. When such overlay data or an overlay call are present, then this is an indication that the data are based on a form. The overlay data or, respectively, the overlay call are then further-processed according to step S7, which is described in greater detail later. Given overlays and macros, the respective call is meaningfully interpreted since a defined overlay or macro need not necessarily also be employed. When, thus, an overlay was already called once, then the status "yes" is output at every later call of this overlay in step S7.

The investigation of the print data can ensue relatively restrictively, i.e. form indicators are only considered established when they relatively clearly indicate that a form is present, i.e. that the corresponding data repeatedly occur within a print job that contains a plurality of pages.

When no overlay was found in step S2, then an investigation is made in step S3 to see whether macro information are present in the current group of print data; potentially, the respective macro is checked in view of typical macro form indicators in step S13. Frequently reoccurring actions are regularly deposited in macros in the print language PCL. There is thus the probability of encountering constant data with a formalistic character, for example fields with an underlying gray background, in the investigation of macros. As warranted, a variable that represents the form indicator is set to 1 (yes) in step S6, and the corresponding print data group is handled further in step S7.

As in step S3, data that contain no macro are also investigated in view of graphic objects in step S4. Here, too, for example, areas filled with gray scale rasters can be recognized in step S14 and can again be characterized as form components with the step S6. In particular, filled rectangles are usually described by structures in corresponding print languages that are easy to recognize. Smaller bitmaps in specific regions, for example a company logo, on the printed pages can also be rewarding objects that can be characterized as form components.

When step S4 also yields no form result, then a check can be carried out in a step S5 to see whether typical, frequently reoccurring text constituents are present in the current print data. One can proceed restrictively in this check under certain circumstances when the text data are highly individualized. When, however, such text data are unambiguously identified as form components in step S115, then step S6 will also lead to step S7 here.

Text objects should likewise be investigated for constancy only in specific regions of a page, for example in the footer line. For example, script attributes can thereby also be investigated. For example, a script size <10 pt. indicates that an information item form information.

When a form indicator was discovered in step S6, then a check is carried out in step S7 to see whether this structure (identical in the NCI space) already occurred earlier. When this condition is not met, then the currently occurring structure is stored in a structure memory 40 in the step S17. In the framework of the normal raster process in step S9, the data are then deposited in the bitmap 19a for variable data in the framework of the normal raster process S9. [sic]

When, on the contrary, it is found in step S9 that a structure is already stored in the memory 40 that corresponds to the current data, then a check is carried out in step S18 to see whether the constant data were already rastered in a preceding page and, thus, are already present as a bitmap. In this case, direct references between the constant data stored in the bitmaps 20a, 20b and 20c and the respectively appertaining variable data can be formed in the step S12. In this reference formation, the memory location of the bitmaps in the read-only memory 20 and the location of the bitmap with respect to the printed page (what is referred to as xy-position) is retained in a reference table 41. When the constant data have not yet been rastered, these data are rastered in a separate raster process for constant date in step S8 and are respectively separately stored as bitmaps 20a, 20b, 20c, etc., in a bitmap for constant data.

After the steps S18, S8, S9 and S12 have been ended, a check is carried out in step S10 to see whether the current data mark a page end; if not, the next print data are read in with step S1. When the page end has been reached, then a logic status variable is set to a value "TRUE" in step S11.

Upon initial occurrence of a structure with a form indicator, this structure is merely stored in coded format in the structure memory 40. As a result of this procedure, only structures that repeatedly occur are subjected to special treatment. Upon initial occurrence of such a structure, the corresponding data are always initially interpreted as variable data.

Given certain events or, respectively, commands within the print data stream (for example, at the beginning of a new print job, given a printer reset or the like), the structures that have occurred are deleted from the structure memory 40.

Given repeated occurrence of an identical structure in the NCI space, this is noted in the reference table 41 in step S12.

Figure 4A:
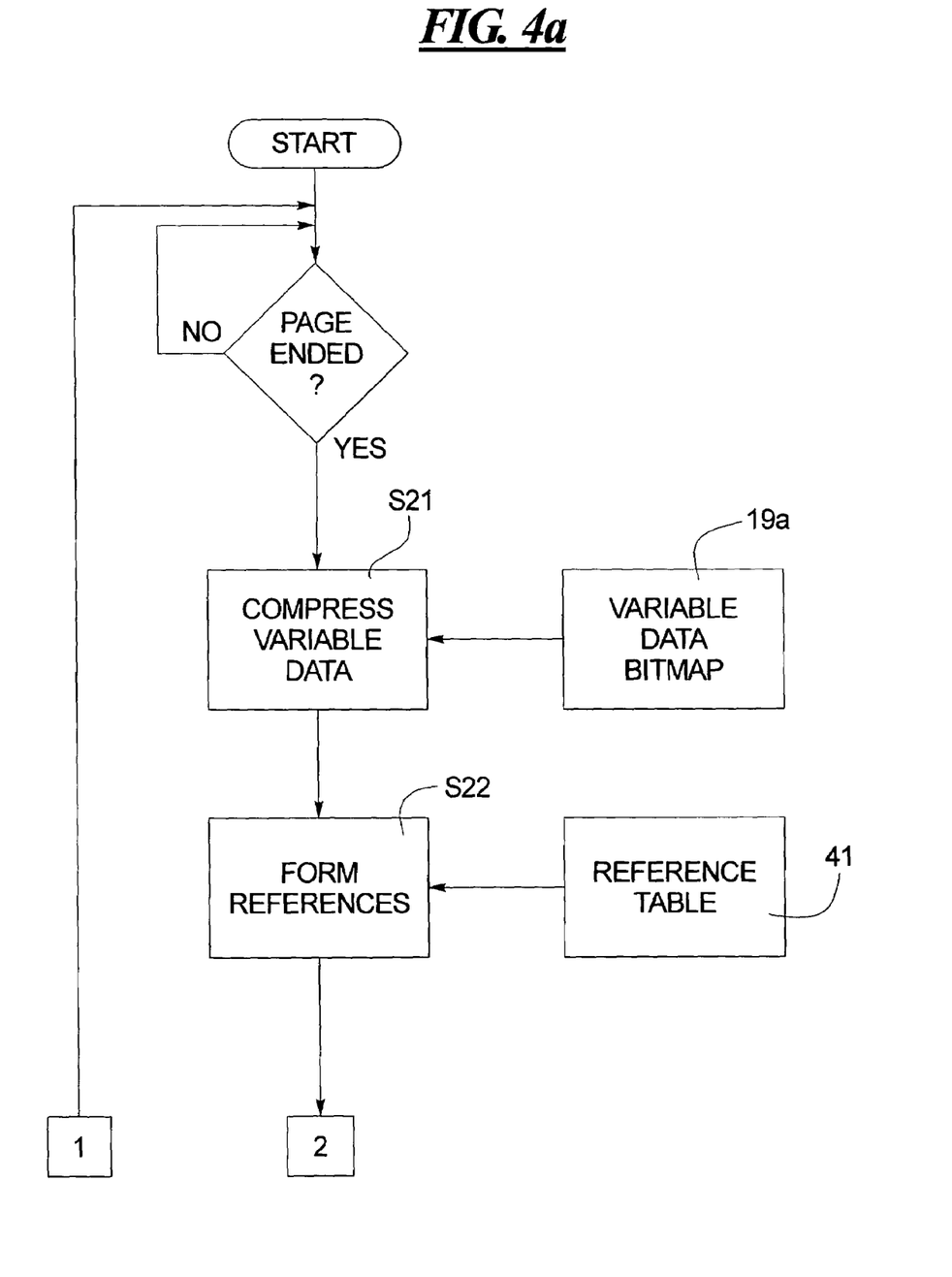
FIGS. 4a and 4b are flow charts an executive sequence for archiving separately stored data.
Figure 4B:
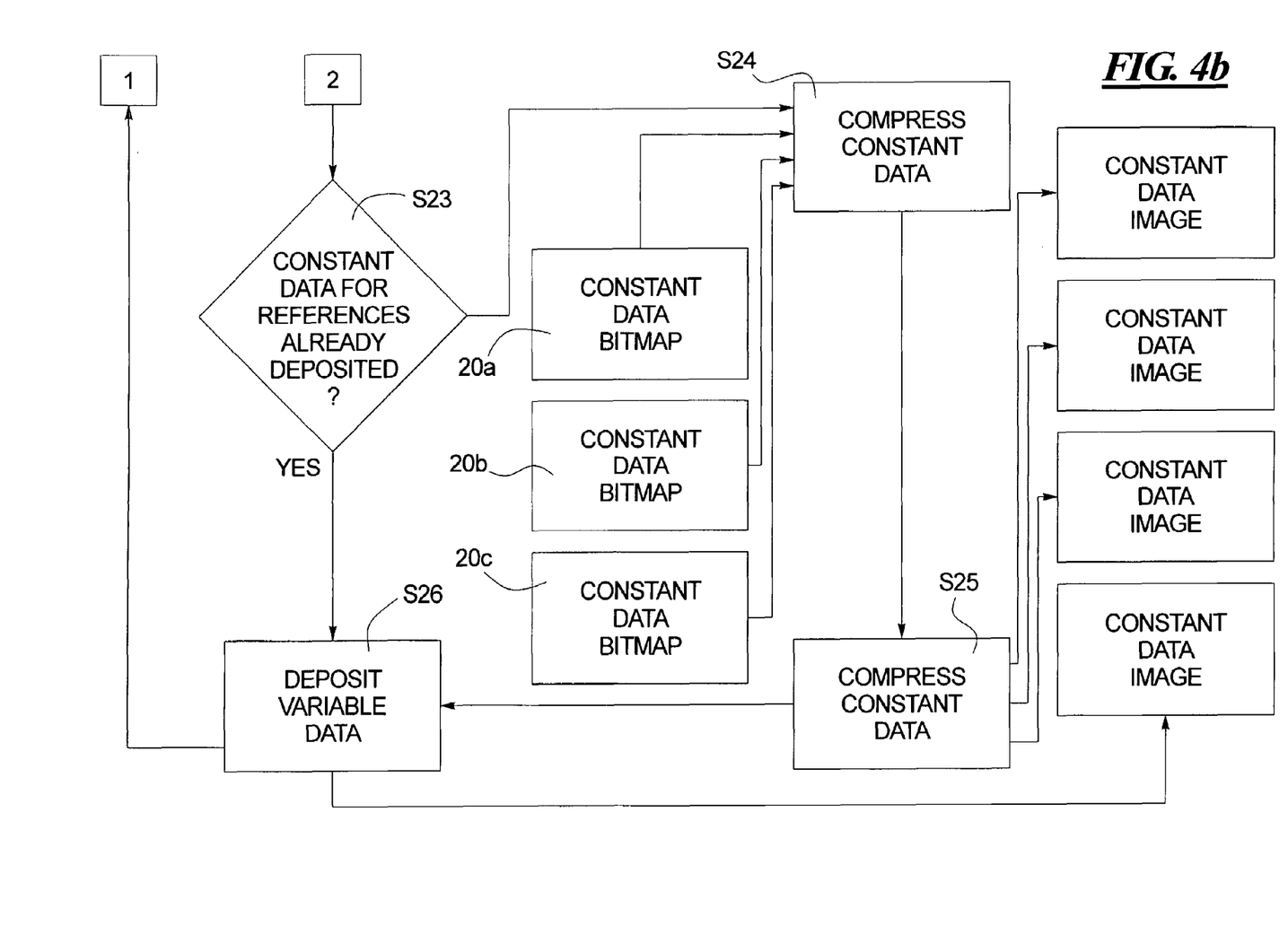

FIG. 4 describes the executive sequence for archiving the print data previously processed according to FIG. 3. In step 20, first, a check is carried out to see whether the page end status variable (see step S11) is set to "TRUE". When this condition is met, then the variable data stored in step S9 or, respectively, in bitmap 19a are compressed in step S21, and, subsequently, references to constant data are formed on the basis of the reference table 41 in step S22 and are stored.

A check is then carried out in step S23 to see whether constant data are already stored in the archive storage for the references formed in step S22. When this is not the case, then the corresponding constant data from the bitmaps 20a, 20b, 20c, etc., are compressed in step S24 upon employment of the reference table 41, and the compressed data are deposited in the archive storage in step S25.

When, in contrast, it is found in step S23 that corresponding data are already deposited in a compressed state in the archive storage, then only the current variable data are compressed in step S26 and deposited in the archive storage. Subsequently, the next dataset is handled in step S20 until all incoming data have been processed.

The variable data are rastered and compressed in a separate memory. When storing the variable data, the references, particularly those to the XY-offset within the page as well as those to the storage location, are attached to the constant data contained on the page.

Figure 5:
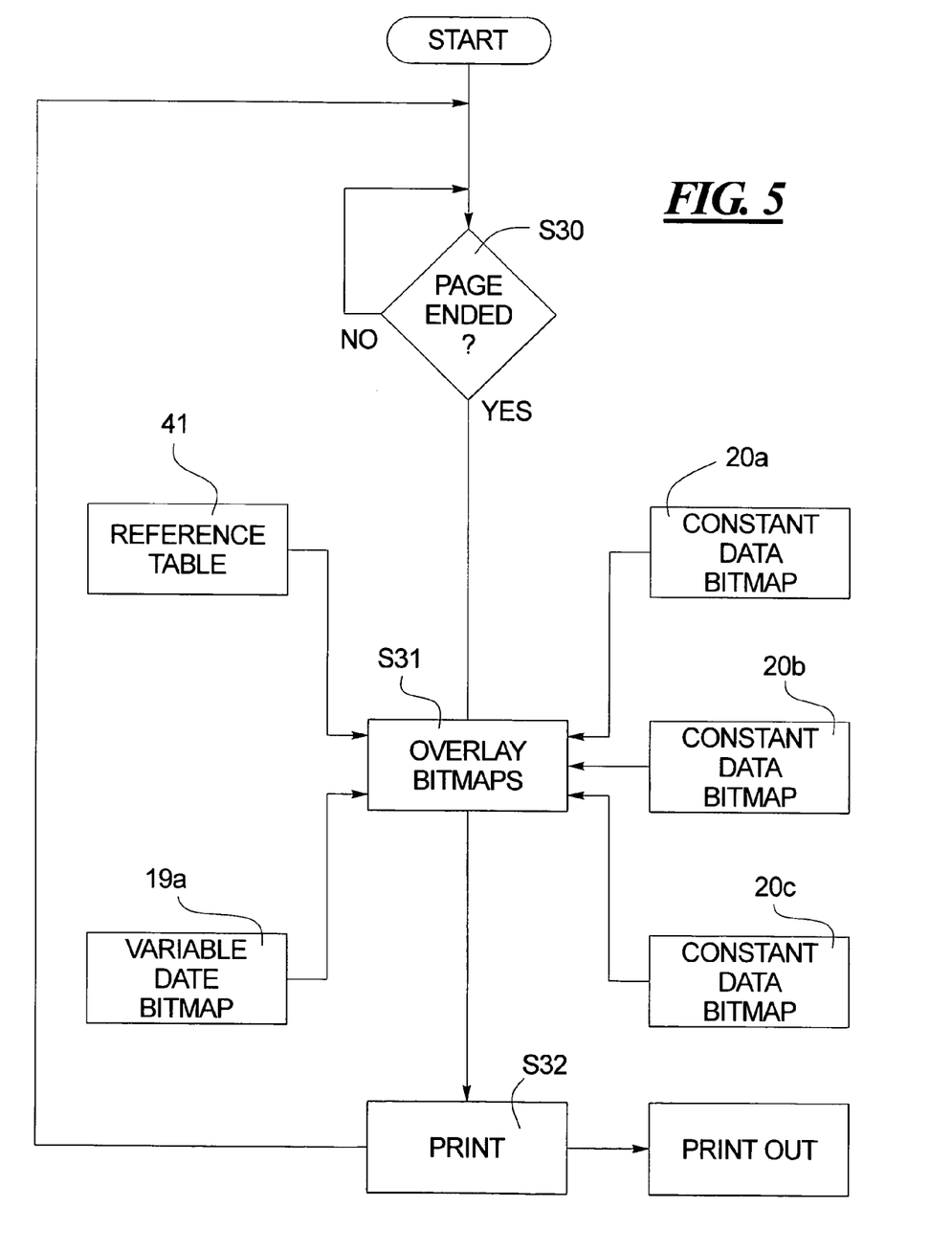
FIG. 5 is a flow chart of an executive sequence or printing a previously separated print data stream.

FIG. 5 shows the process for printing the data processed according to FIG. 3. In step S30, a check is again carried out to see whether all data of a page have been processed, i.e. whether, in step S11 of FIG. 3, the variable for the page end has been set to "TRUE". When this is the case, then—for printing in step S31—the bitmaps 19a of the variable data of a page that are stored in memory 19 are superimposed with the corresponding bitmaps 20a, 20b and 20c of the constant data of the appertaining page on the basis of the reference table 41. This, for example, can occur with a logical OR operation between the corresponding bitmap. Subsequently, the printing event can be started in step S32.

Proceeding from the method for the investigation of the data presented in FIG. 3, the processes of FIGS. 4 and 5, i.e. archiving and printing, can ensue in parallel.

Exemplary embodiments of the invention have been described. It is thereby clear that modifications and developments of the invention can be recited without further ado. For example, it can be provided in a printing and archiving system that the user or, respectively, the application program already provides repeatedly reoccurring data (form data) with special identifiers when the data stream is generated (for example, on the basis of a corresponding control information), and that these identifiers are correspondingly interpreted in the later archiving or, respectively, printing event. Similar to the case of the overlay information, a reliable decision can thus be made that certain data are form data.

In the data editing process (FIG. 3), it can also be advantageous to immediately implement the steps S24 and S25 and deposit the constant data in the archive storage following the rastering of the constant data in step S8. To this end, however, the storage types of the data must be known early.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A method for electronic archiving of a data stream output by a computer in a printer-specific data format that contains at least one of graphic information and text information, comprising the steps of:
    distinguishing form data from variable data in the data stream while said data is in a printer data format;
    converting the data stream from the printer specific format into a data format based on pixels;
    differently processing said form data and said variable data in the data stream based on pixels by a raster control, wherein said form data re-occurs a plurality of times in interrelated data sets;
    storing a form dataset of identical form data only once within a predetermined data group, said form data being based on pixels;
    storing all allocated variable data of all datasets of the data group, said variable data being based on pixels;
    wherein said form data is used for a plurality of different documents.

2. A method according to claim 1, further comprising the step of: allocating references to the form data to the variable data.

3. A method according to claim 1, wherein said printer data format is printer-specific data.

4. A method according to claim 3, further comprising the step of: seeking form indicators for recognizing form data in the data stream.

5. A method according to claim 3, further comprising the steps of:
    investigating data of the data stream first in groups for form data, and
    allocating between the variable data and the form data only given repeated occurrence of form data.

6. A method according to claim 5, further comprising the step of: using overlay information form indicators.

7. A method according to claim 3, further comprising the steps of:
    storing a form dataset after a first occurrence within the predetermined data group of the print data stream; and
    only marking data as a form dataset, converting the data into a form bitmap and allocating the data to an appertaining variable dataset after a repeated occurrence.

8. A method according to claim 1, further comprising the steps of: within a work sequence, implementing at least one of printing and archiving.

9. A method as claimed in claim 6, wherein said overlay information is selected from the information consisting of control information, macro information, graphic information, predetermined text modules and predetermined text attributes.

10. A method for electronic archiving of a data stream output by a computer in a printer-specific data format that contains at least one of graphic information and text information, comprising the steps of:
   distinguishing form data from variable data in the data stream while said data is in a printer data format;
   converting the data stream from the printer specific format into a data format based on pixels;
   differently processing the variable data and the form data when they are in the data format based on pixels by a raster control,
   wherein the form data are not stored in the archive storage.

11. A method for electronic archiving of a data stream output by a computer in a printer-specific data format that contains at least one of graphic information and text information, comprising the steps of:
   distinguishing form data from variable data in the data stream while said data is in a printer data format;
   converting the data stream from the printer specific format into a data format based on pixels;
   differently processing the form data and the variable data when they are in the data format based on pixels by a raster control; and
   reconstructing an original pixel image from the form data and the variable data.

12. A method for electronic archiving of a data stream output by a computer in a printer-specific data format that contains at least one of graphic information and text information, comprising the steps of:
   distinguishing form data from variable data in the data stream while said data is in a printer data format;
   converting the data stream from the printer specific format into a data format based on pixels;
   differently processing the form data and the variable data when they are in the data format based on pixels by a raster control; and
   using references to superimpose the form data and the variable data.

13. A method for electronic archiving of a data stream output by a computer in a printer-specific data format that contains at least one of graphic information and text information, comprising the steps of:
   distinguishing form data from variable data in the data stream while said data is in a printer data format;
   differently processing the form data and the variable data when they are in the data format based on pixels by a raster control; and
   generating an index dataset.

14. A method according to claim 13, wherein the index dataset contains a reference to the variable data.

15. An apparatus for electronic archiving of a data stream output by a computer in a printer-specific data format that contains at least one of graphic and text information, wherein the print data stream is converted from the printer-specific data format into a data format based on pixels, comprising:
   an archiving interface that differently processes form data and variable data in the data format based on pixels, said archiving interface including a raster control.

16. An apparatus according to claim 15, further comprising:
   a printer controller that transfers variable data, form data and index data to a further-processing computer via an interface.

17. An apparatus according to claim 16, wherein said print controller includes a further-processing computer integrated in the printer controller.

18. An apparatus according to claim 15, wherein said archiving interface is operable to make a distinction between form data and variable data.

* * * * *